(12) United States Patent
Sobota

(10) Patent No.: US 6,659,870 B2
(45) Date of Patent: Dec. 9, 2003

(54) GAME CONTROLLER

(75) Inventor: John F. Sobota, Edmonton (CA)

(73) Assignee: Arista Enterprises Inc., Hauppauge, NY (US)

( * ) Notice: Subject to any disclaimer, the term of this patent is extended or adjusted under 35 U.S.C. 154(b) by 0 days.

(21) Appl. No.: 10/367,209

(22) Filed: Feb. 14, 2003

(65) Prior Publication Data

US 2003/0139213 A1 Jul. 24, 2003

Related U.S. Application Data

(63) Continuation of application No. 09/800,253, filed on Mar. 6, 2001.

(51) Int. Cl.[7] .................................................. A03F 9/22
(52) U.S. Cl. ..................................... 463/37; 273/148 B
(58) Field of Search ............................... 463/30, 36–38; 273/148 B; 434/45, 46, 59; 345/701, 702, 161, 163, 167

(56) References Cited

U.S. PATENT DOCUMENTS

| | | | | |
|---|---|---|---|---|
| 4,285,523 A | * | 8/1981 | Lemelson | 463/5 |
| 5,207,426 A | * | 5/1993 | Inoue et al. | 463/36 |
| 5,989,123 A | * | 11/1999 | Tosaki et al. | 463/37 |
| 6,102,802 A | * | 8/2000 | Armstrong | 463/37 |

* cited by examiner

Primary Examiner—Mark Sager
Assistant Examiner—Steven Ashburn
(74) Attorney, Agent, or Firm—Keusey, Tutunjian & Bitetto, P.C.

(57) ABSTRACT

A steering/driving game controller integrates an additional steering lever to the underside of the game controller. The steering lever is spring biased in a center operable positions and is variably actuated such that it is responsive to varying degrees of depression. In response to the varying degree of user depression, the steering/driving controller is capable of outputting steering control signals of varying level to a connected game console, thereby enabling more selective and more accurate driving control within a video game being played on the connected game console.

15 Claims, 10 Drawing Sheets

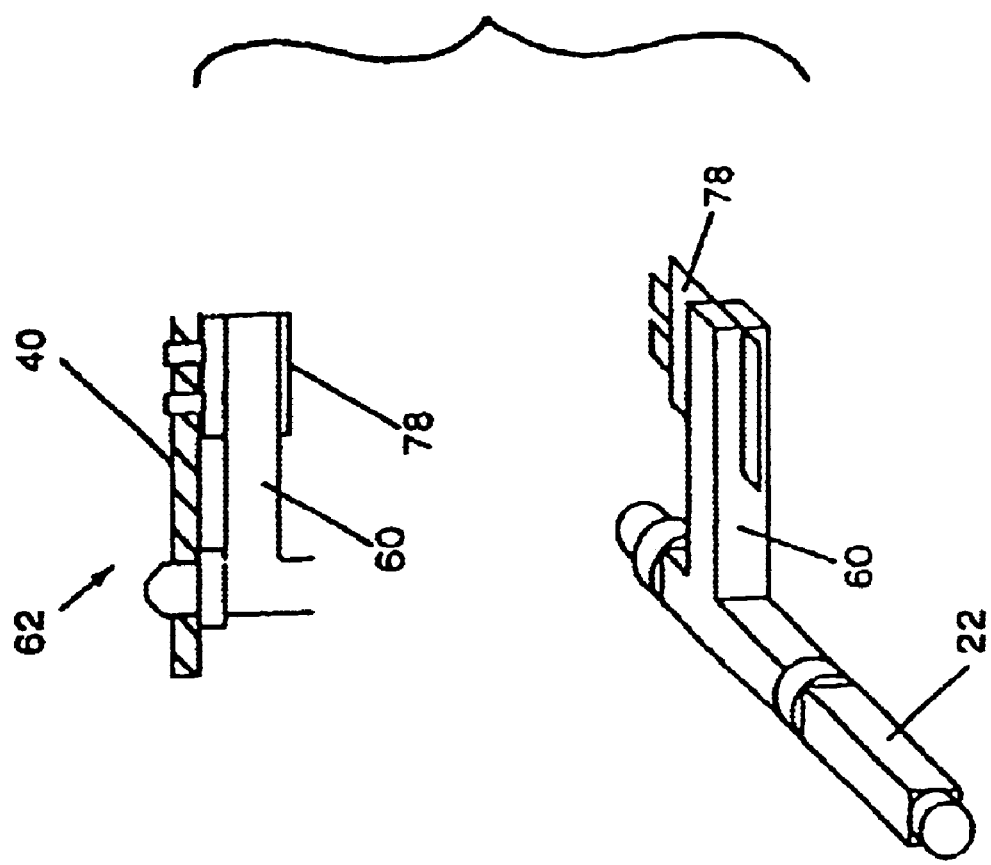

GAME CONTROLLER

This application is a continuation of co-pending U.S. patent application Ser. No. 09/800,253 filed Mar. 6, 2001.

BACKGROUND OF THE INVENTION

1. Field of the Invention

The present invention relates to game controllers, and more particularly, to a genre specific game controller for driving or steering applications.

2. Description of the Prior Art

The concept of a genre specific game controller is well known in the gaming industry. Examples of such genre specific games that utilize genre specific game controllers are flight simulators, first person shooting games, and driving games.

Some examples of driving or steering assemblies for video gaming are shown in U.S. Pat. Nos. 5,829,745 and 6,083,106. The '745 patent discloses a video game control unit with self-centering steering wheel. This control unit includes a separable console and base sections, with the console section housing a steering wheel video game input device that automatically returns to a central, neutral position. This steering wheel controller is very cumbersome and is exclusively dedicated to driving games and cannot be used with other genres of games.

U.S. Pat. No. 6,083,106 discloses a video game race car simulator assembly for simulating sitting in the driver seat of a racing car when playing a driving video game. This simulator is not designed for home use, and as such prevents the implementation into home video gaming systems such as, for example, Sony PlayStation®, Sega DREAMCAST®, Nintendo 64®, etc.

U.S. Pat. No. 5,785,317 discloses an operation apparatus for a game machine. This game controller is a two-handed controller requiring the user to hold both sides simultaneously and thereby enable them to actuate controls on both sides of the housing. In addition, the housing of this game controller is designed to twist in the middle so as to provide the user with improved feeling and operation. This controller can be utilized for driving games and provide the user with the ability to "steer" by twisting the controller accordingly. This design, althoughunique has a shortfall in that the twisting action of the controller can interfere with the user's ability to actuate any of the controls mounted on the top of the controller. As such, there is too much movement in the controller to provide the user with accurate control over the game being played.

U.S. Pat. No. 5,923,317 discloses a two-handed controller for video games and simulations. This game controller shows the use of buttons disposed on the underside of the game controller to simulate trigger action for the user. These trigger buttons are not part of the D-pad or other movement controls associated with the controller.

To date, all video game controllers for the home gaming environment utilize movement controls and trigger controls (i-e., buttons that control a game action such as, for example, firing one or more weapons and braking or acceleration of a motor vehicle). The movement controls are generally in the form of a joystick or D-pad. The joystick or D-pad provides the user with two-dimensional movement control in a fixed plane. Although most controllers are designed for two-handed actuation, the movement controller (i.e., joystick or D-pad) is one part of the controller that is generally actuated with one of the user's hands (or fingers). As such, in certain genre specific gaming environments, the standard two-dimensional movement control provided by a D-pad or joystick is less than desirable and makes playing the game more difficult for the user.

Examples of such genre specific games are driving games where the user is required to steer a motor vehicle. These games generally require a higher degree of precision and variability in the game controls in order to properly effect steering during play. In addition, in order to provide a more realistic driving/steering experience, the user should be required to utilize both hands for steering. The standard D-pad or joystick fails to meet this preferred criteria. Other steering wheel controllers in the shape of a steering wheel promote the two-handed driving/steering experience, however fail to generally provide the other ergonomically preferred designs of two-handed controllers (e.g., U.S. Pat. Nos. 6,102,803 and 5,785,317)., including the disposition of other controls used in conjunction with the genre specific control.

SUMMARY OF THE INVENTION

It is therefore an object of the present invention to provide a game controller that includes additional driving/steering game controls for operation by the user without interfering with the other existing buttons or controls on a two-handed game controller.

It is another object of the invention to provide a game controller that may be selectively used with genre specific driving games, while remaining capable of performing all standard basic two-handed gaming functions.

Yet another object of the invention is to provide a game controller having dedicated driving/steering levers disposed on the underside of the controller that provide more accurate and reliable steering control to the user.

These and other objects are achieved in accordance with an embodiment of the invention, wherein a genre specific game controller for driving and steering applications includes a game controller housing adapted for two-hand operation, a plurality of game controls disposed on an upper side of said housing, and a steering lever disposed on an underside of said housing and having two lever ends each adapted to be actuated by fingers on one of the user's hands.

According to one embodiment, the steering lever is a single piece lever having a rotation axle rotatably connected to the game controller through said housing. The lever ends extend from the rotation axle and when one end is rotated about the rotation axle, the other end moves in an opposite direction. Electronic circuitry disposed within the game controller housing detects the position of the steering lever and outputs variable electrical control commands corresponding to the detected variable positions of the lever ends.

According to another embodiment, the steering lever is a two piece lever having a central axle. Each piece of the two piece lever is rotatably connected to the game controller about the central axle and through the housing. Each of the lever ends are formed by one of the two piece lever and each are independently operable with respect to the other. Electronic circuitry disposed within the game controller housing detects the independent position of each of the steering lever ends and outputs variable electrical control commands corresponding to the detected variable positions of the lever ends.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numeral denote similar components throughout the views:

FIG. 8b is partial cross section of the lever arrangement of the embodiment of FIG. 8a;

FIG. 9b is a partial cross section of the lever arrangement of the embodiment of FIG. 9a;

FIG. 10b is an exemplary implementation of the sensor arrangement for the embodiment depicted in FIG. 10a, FIG. 10c is another exemplary implementation of the sensor arrangement for the embodiment depicted in FIG. 10a;

FIG. 11c is a block representation of the sensor configuration according to another embodiment of the invention.

DETAILED DESCRIPTION OF PREFERRED EMBODIMENTS

Figure 1A:
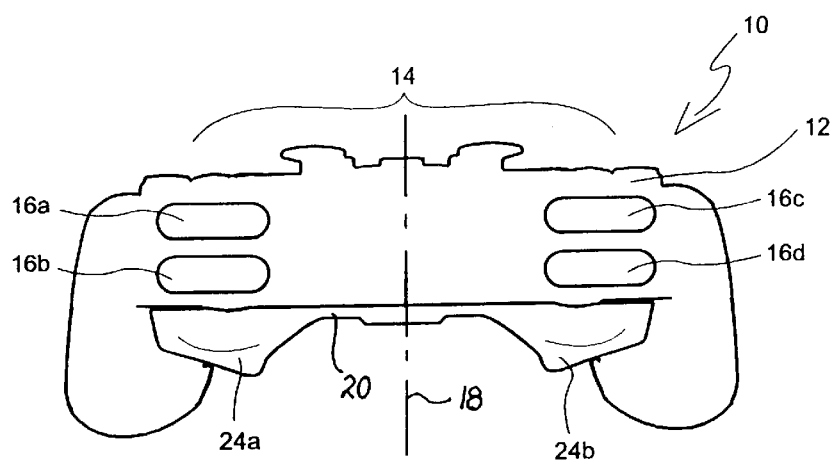
FIG. 1a is a front view of a game controller according to a first embodiment of the invention.
Figure 1B:
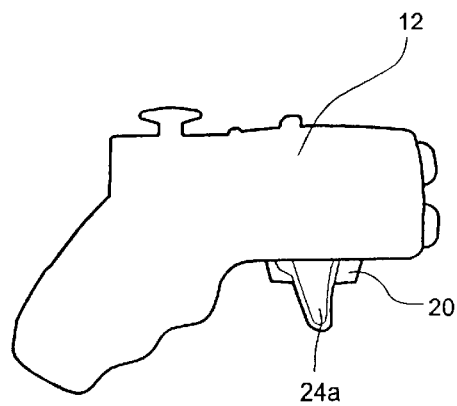
FIG. 1b is a side view of the game controller according to the first embodiment of the invention.
Figure 1C:
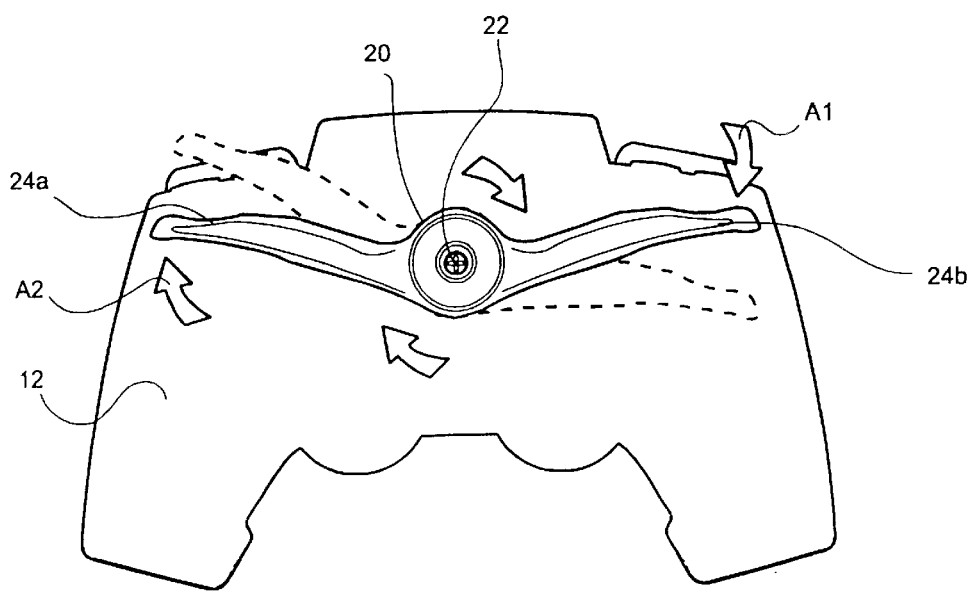
FIG. 1c is a bottom view of the game controller according to the first embodiment of the invention.

Referring to FIG. 1a–1c, there is shown a game controller 10 according to a first embodiment of the invention. Game controller 10 includes a housing 12, a plurality of upper game controls 14 and a plurality of front control buttons 16a–16d. A central axis 18 runs through game controller housing 12 transverse to the two-dimensional plane in which the D-pad or joystick operates. The aforementioned D-pad and/or joystick are included in the plurality of upper game controls 14.

In accordance with the present embodiment, a driving/steering lever 20 is disposed on the underside of the controller housing 12 and is rotatably mounted about a rotation axle 22 which is coaxially aligned with central axis 18. Lever 20 is spring biased into a center position and includes two lever ends 24a and 24b positioned to be actuated by the fingers of the user's right and left hands, respectively. Lever 20 is variably actuated based on the degree of depression applied by the user. Referring to FIG. 1c, when lever end 24b is actuated in the direction indicated by arrow Al, the opposing end 24a is displaced an equal amount in the direction A2 (as shown by dotted lines in FIG. 1c). The variable position ability of lever 20 in addition to its ergonomic disposition on the underside of the controller allows the user to more accurately and realistically apply steering control in response to the video game being played. The rotating action of lever 20 enables the steering/driving control to be accurately and variably controlled while allowing the user to maintain both hands on the controller at all times. This further allows the user to actuate any of the upper 14 or front 16 controls during steering/driving action.

Figure 5A:
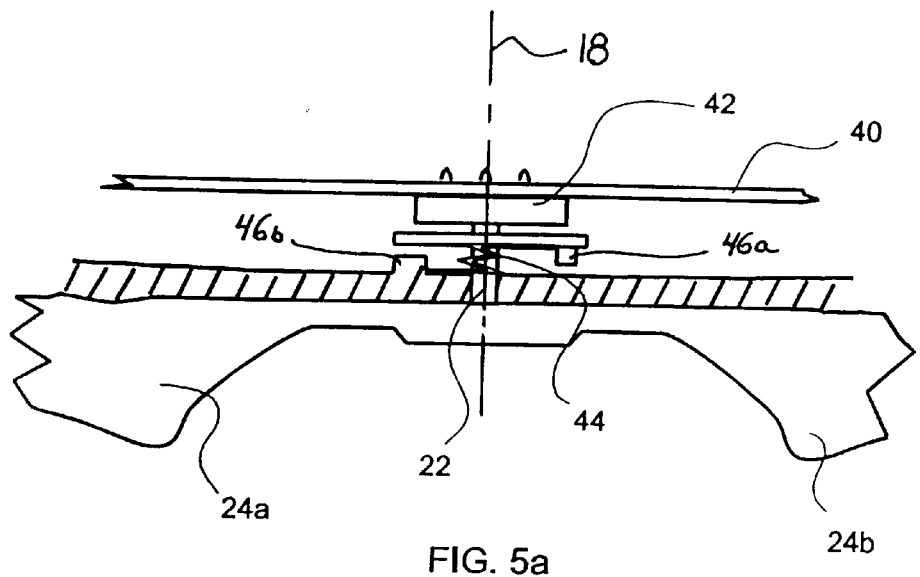
FIG. 5a is a partial cross section showing the internal operation of the game controller according to the first embodiment of the invention.

FIG. 5a shows one example of the electronic implementation of lever 20 into game controller 10. As shown a potentiometer 42 is connected to a printed circuit board 40 contained within housing 12. Rotation axle 22 of lever 20 is connected to or integral with the stem of potentiometer 42, and a spring 44, wound around axle 22 and held in place by notches 46a and 46b, biases lever 20 into its central operable position. Thus, the actuation of either lever end 24a or 24b changes the resistance output of potentiometer 42 and thereby allows for the variable steering/driving adjustment of a video game being played through a connected game console (not shown).

Figure 2A:
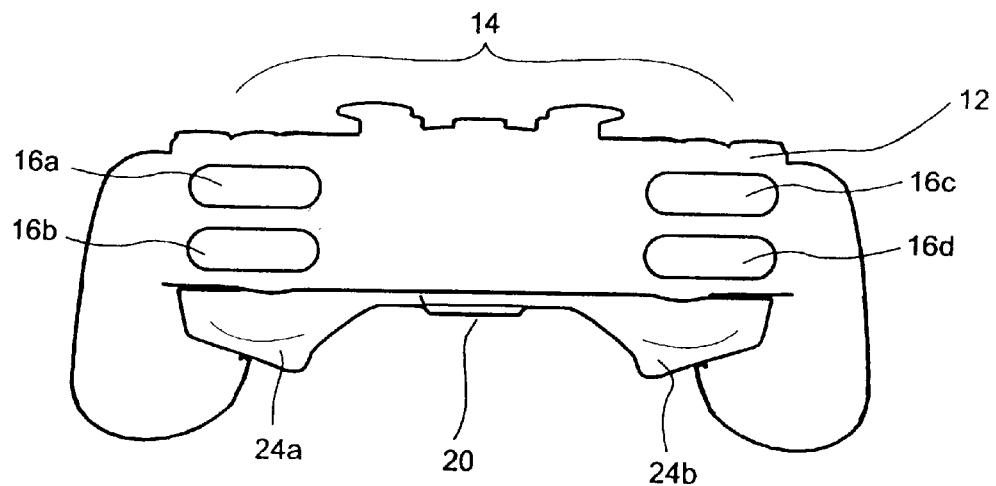
FIG. 2a is a front view of a game controller according to a second embodiment of the invention.
Figure 2B:
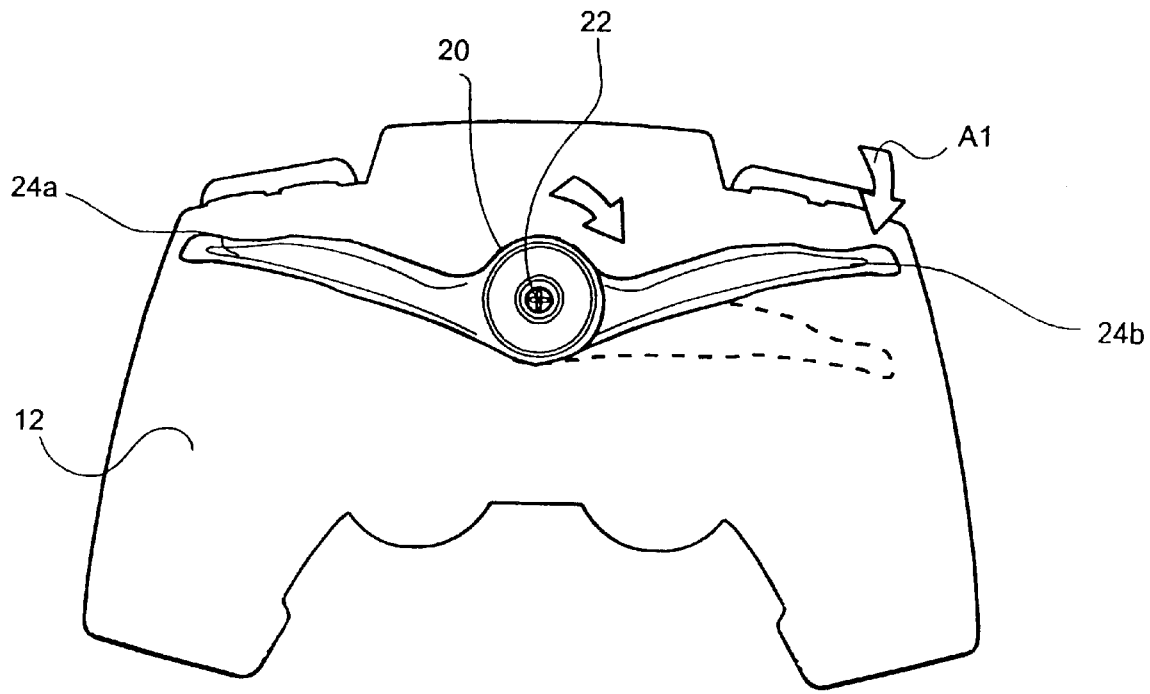
FIG. 2b is a bottom view of the game controller according to the second embodiment of the invention, FIG. 3a a front view of a game controller according to a third embodiment of the invention.
Figure 9A:
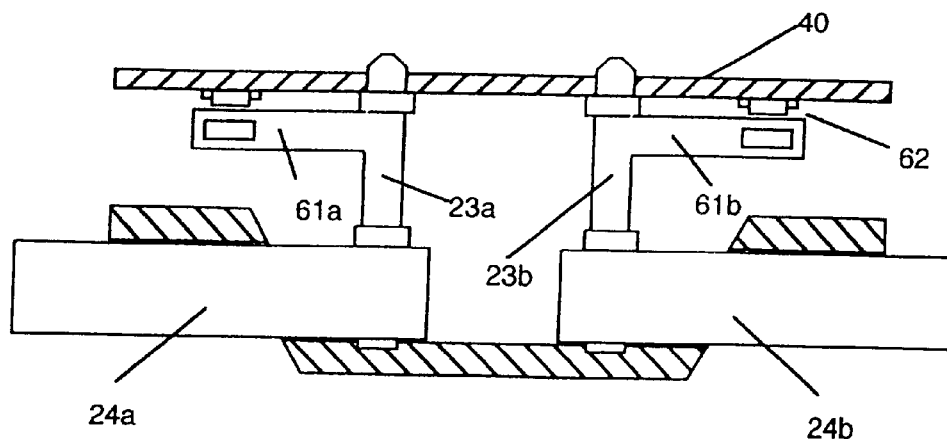
FIG. 9a is a partial cross section showing another embodiment of the internal operation of game controller according to the second embodiment of the invention.
Figure 9B:
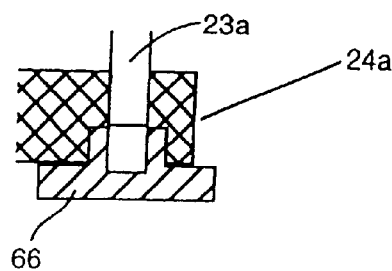

FIGS. 2a and 2b show a second embodiment where steering lever 20 is separated into two independently operable parts consisting of lever ends 24a and 24b. In this embodiment, each lever end 24a and 24b is independent of the other. Thus, when lever end 24b is depressed in the direction indicated by A1, lever end 24a does not move. This embodiment requires additional control circuitry as shown in FIGS. 5b and 9a.

Figure 5B:
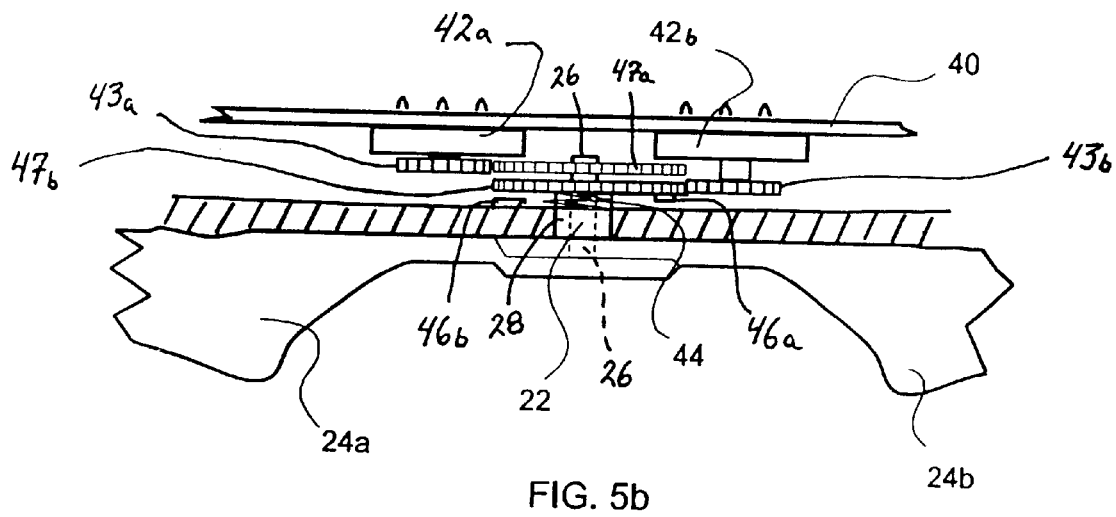
FIG. 5b is a partial cross section showing the internal operation of game controller according to the second embodiment of the invention.

Referring to FIG. 5b, there is shown an embodiment for the independent control and actuation performed by independent levers 24a and 24b. As shown, separate potentiometers 42a and 42b are connected to circuit board 40 and to the respective lever end 24a and 24b via a gear mechanism made up of gears 47a and 47b. Those of skill in the art will recognize that the rotation axle 22 must now be configured to allow each lever end 24a and 24b to rotate independently of each other. Axle 22 can be configured to have an inner axle 26 connecting lever end 24a to potentiometer 42a via gears 47a and 43a. Accordingly, an outer axle 28 connects lever end 24b to potentiometer 42b via gears 47b and 43b. The spring 44 can be positioned as shown and notches 46a and 46b are disposed accordingly to allow each lever end 24a and 24b to be spring biased in a desired direction or position. Thus, when one lever end 24a or 24b is actuated, the corresponding potentiometer 42a or 42b will change its resistance output in response to that movement and thereby allow the variable, and increased accuracy of driving control in the desired direction.

The embodiment shown in FIG. 5b is one example of how such configuration may be implemented. Those of ordinary skill will recognize that various other methods for allowing the independent rotation and actuation may be implemented without departing from the spirit of the invention.

Figure 6A:
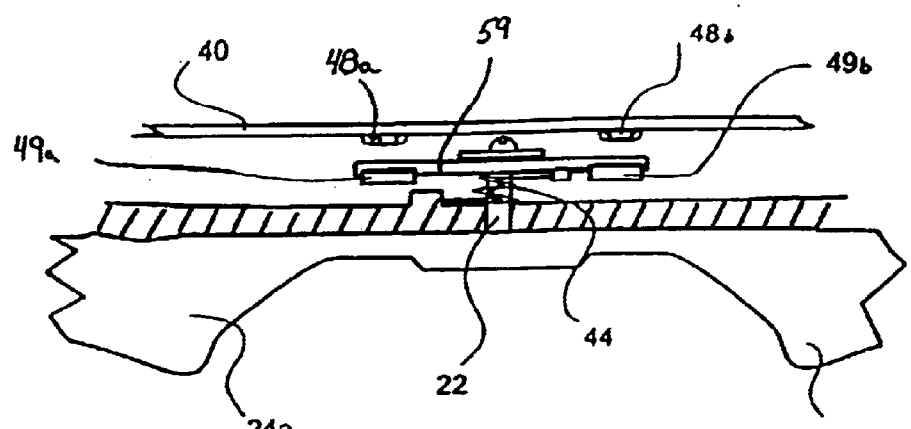
FIG. 6a is a partial cross section showing the internal operation of the game controller according to the first embodiment of the invention.
Figure 6B:
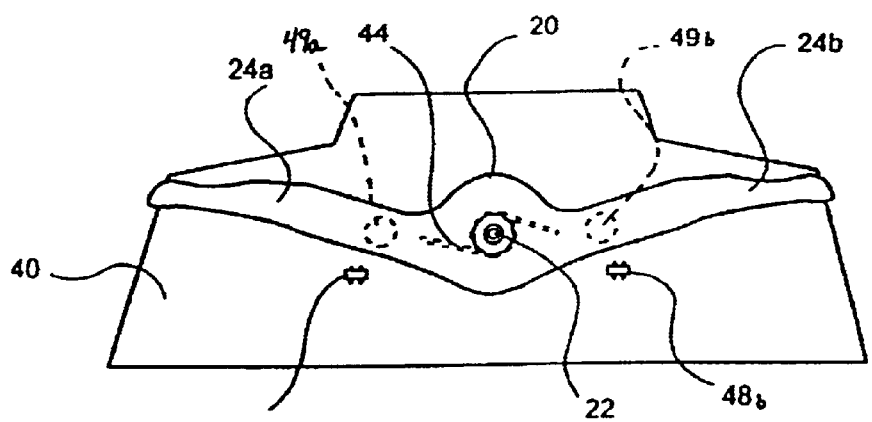
FIG. 6b is a partial cross section showing the internal operation of the game controller according to the first embodiment of the invention.

FIGS. 6a and 6b show another circuitry implementation operable for the embodiment depicted in FIGS. 1a, 1b and 1c. In this embodiment, a pair of hall effect sensors 48a and 48b are connected to the circuit board 40, and an opposing pair of magnets 49a and 49b are positioned on a holder 59 mounted to the axle 22. Thus, when either of the lever ends 24a or 24b are moved, the positions of the magnets 49a and 49b are detected by the corresponding hall effect sensors 48a and 48b (i.e., based on the strength of the magnetic fields created by the magnets), and the corresponding electrical steering/driving command is generated and output to the connected game console (not shown).

Figure 3A:
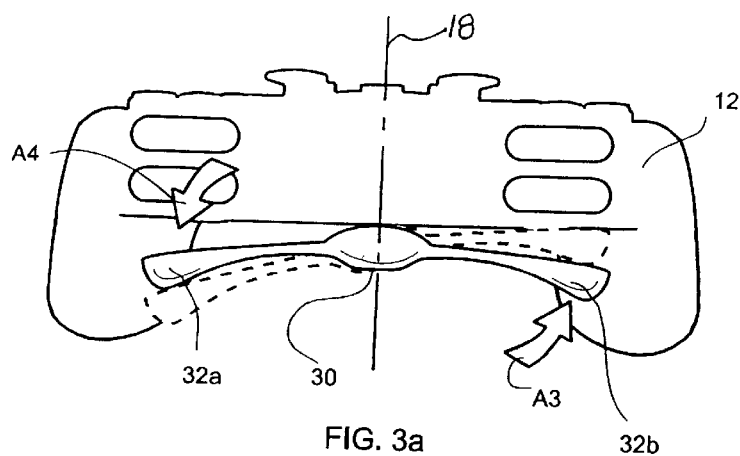
FIG. 3b is a side view of the game controller according to the third embodiment of the invention.
FIG. 3c is a bottom view of the game controller according to the third embodiment of the invention.
Figure 3B:
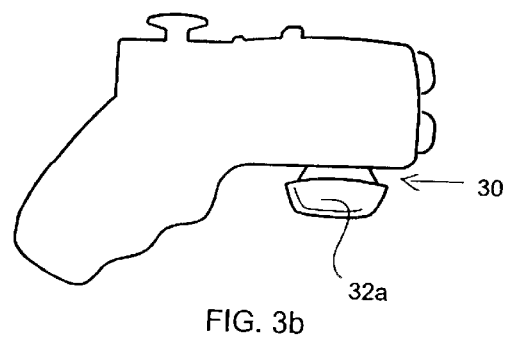
Figure 3C:
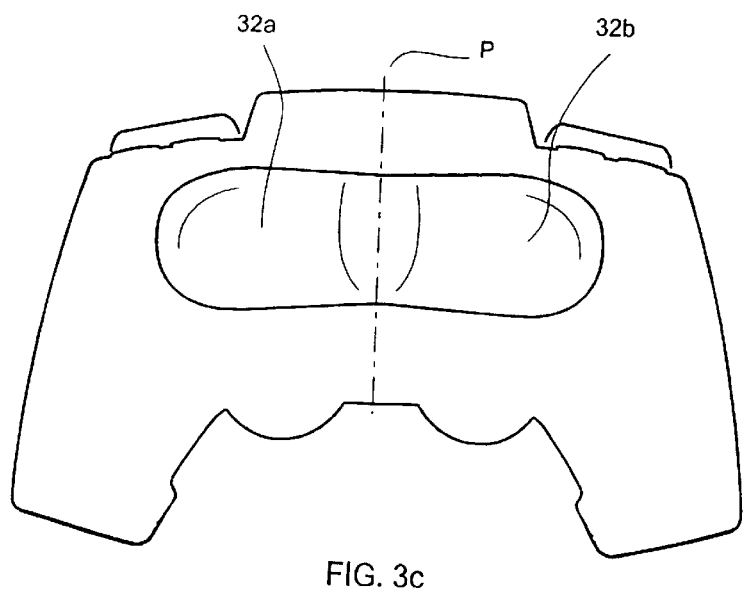
Figure 4A:
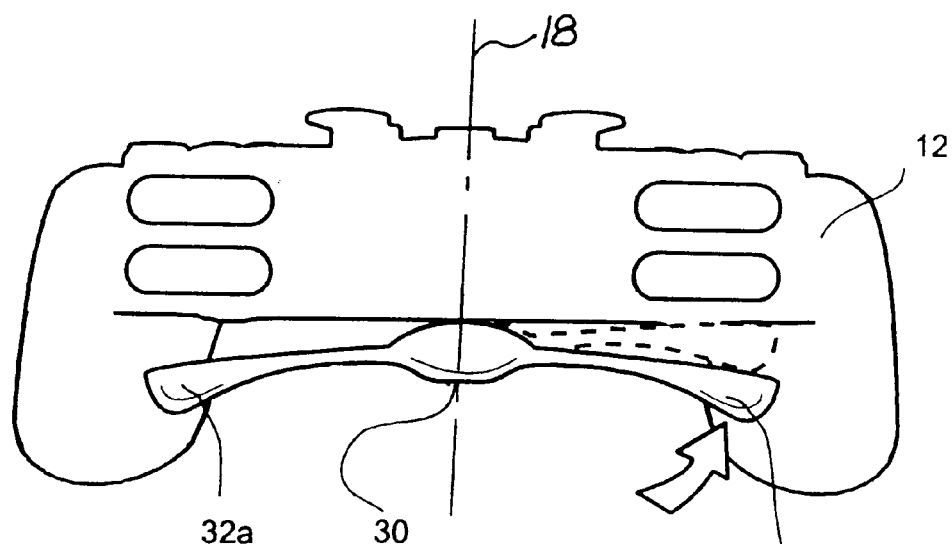
FIG. 4a is a front view of a game controller according to a fourth embodiment of the invention.
Figure 4B:
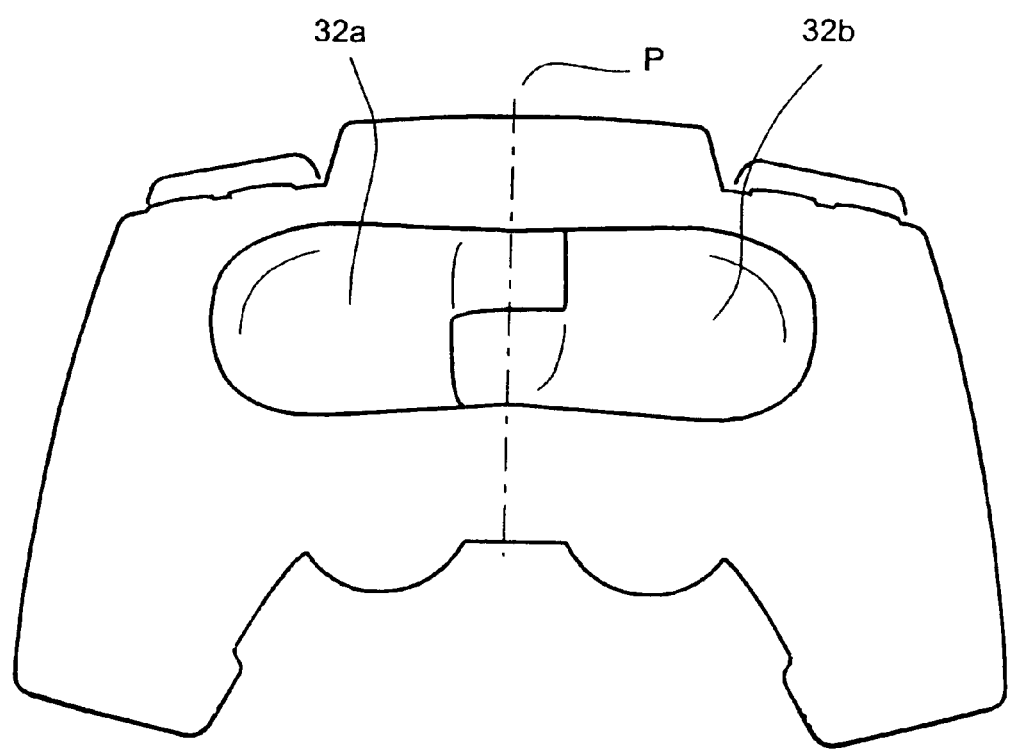
FIG. 4b is a bottom view of the game controller according the fourth embodiment of the invention.

FIGS. 3a–3c show a third embodiment where steering lever 30 is a one piece lever that pivots about a centrally disposed pivot line P, transverse to central axis 18. Steering lever 30 is spring biased and includes lever ends 32a and 32b that are actuated by the user engaging and pulling the lever end in the direction indicated by arrow A3. When lever end 32b is engaged as shown in FIG. 3a, opposing end 32a responds by moving in an opposite direction A4 (shown in dotted lines). The pivotal action of lever 30 enables the steering/driving control to be accurately and variably controlled while allowing the user to maintain both hands on the controller at all times. This further allows the user to actuate any of the upper 14 or front 16 controls during driving action. FIGS. 4a and 4b show a modified embodiment where lever 30 is separated into two independently operable ends 32a and 32b, each being pivotal about pivot line P.

Figure 7:
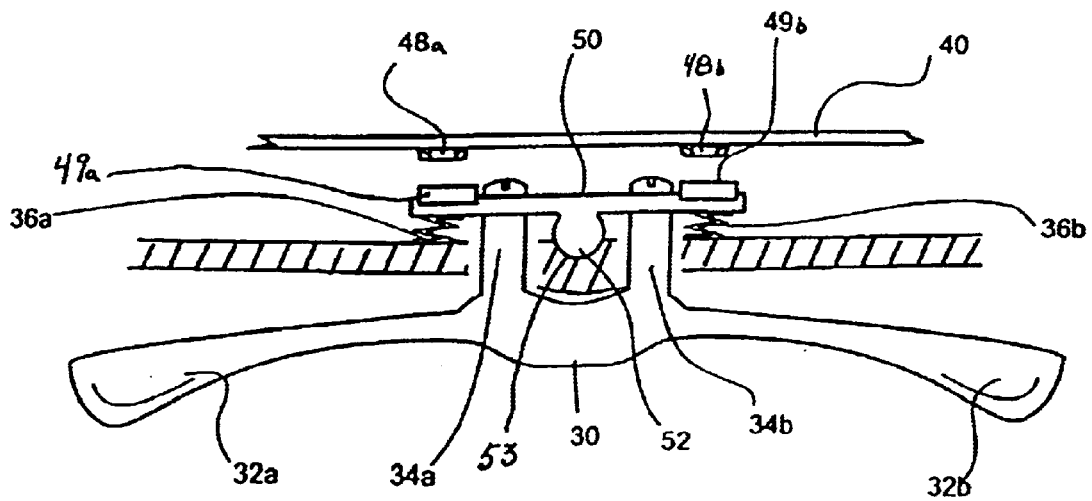
FIG. 7 is a partial cross section showing the internal operation of the game controller according to the third embodiment of the invention.

FIG. 7 shows the electrical implementation of the embodiments disclosed in FIGS. 3a–4b. As shown, the lever arm 30 is connected to a pivot mount 50 by two legs 34a and 34b. The pivot mount 50 includes a pivot ball 52 pivoting upon a pivot indentation 53 within the controller housing, and magnets 49a and 49b arranged thereon. The pivot mount 50, and thereby lever arm 30, is biased into a center position by springs 36a and 36b. Corresponding hall effect sensors 48a and 48b are mounted on the circuit board 40 and are positioned so as to detect the movement of the respective magnets 49a and 49b and produce electrical control signals accordingly. In the independent arm operation embodiment of FIGS. 4a and 4b, the pivot mount 50 need not be separated into two parts, but rather the lever arm 30 separated into it's two lever ends 32a and 32b while retaining a flexible connection to prevent separation from each other. In this arrangement, the hall effect sensors 48a and 48b and magnets 49a and 49b will continue to operate as desired.

Figure 8A:
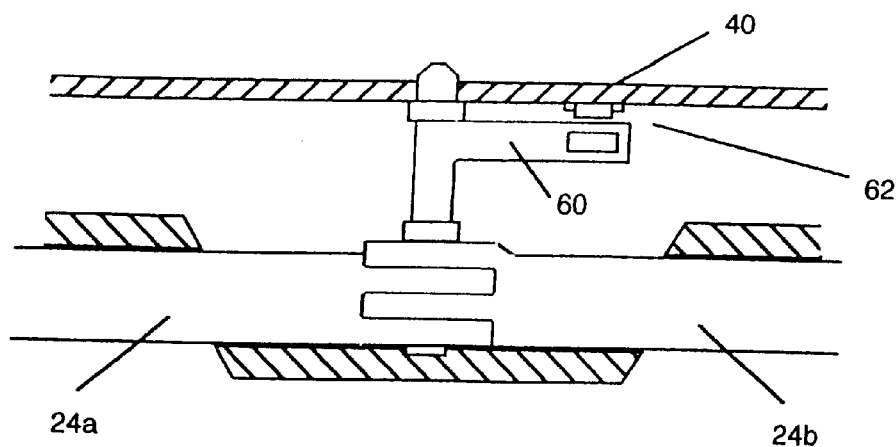
FIG. 8a is a partial cross section showing another embodiment of the internal operation of the game controller according to the first embodiment of the invention.
Figure 8B:
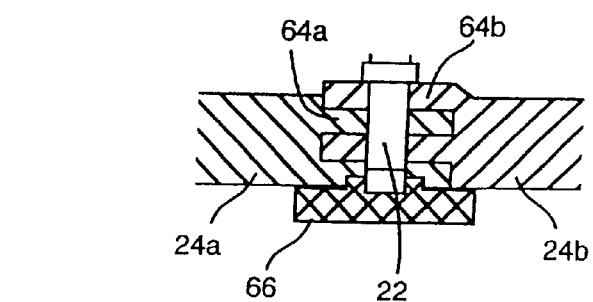

FIGS. 8a and 8b show another embodiment of the electronic implementation of lever 20 (made up of lever ends 24a and 24b) into the game controller. As shown, lever ends 24a and 24b have interlocking teeth 64a and 64b, respectively, arranged around the rotation axle 22. A cap or other securing mechanism 66 attached onto axle 22 and retains lever ends 24a and 24b in their operable position on the underside of the game controller. An arm or extension 60 is connected to rotation axle 22 and includes a sensor mechanism 62 for sensing the rotation motion of the lever ends 24a and 24b and providing output signals corresponding to the detected lever end movement. Sensor mechanism 62 is described later with reference to FIGS. 11a–11c FIGS. 9a and 9b show another embodiment of the electronic implementation of lever 20 (made up of lever ends 24a and 24b) into the game controller. This embodiment is particularly suited for the independent operation of lever ends 24a and 24b, as discussed above with respect to the embodiments of FIGS. 2a and 2b. As shown, each lever end 24a and 24b includes a corresponding rotation shaft 23a and 23b having an arm or extension 61a and 61b, respectively. Extensions 61a and 61b carry part of the sensor mechanism 62 used to detect the rotation position of each lever arm 24a and 24b, respectively. As with the embodiment of FIGS. 8a and 8b, a cap or other device 66 secures the levers 24a and 24b in their operable positions and onto rotation axles 23a and 23b, respectively.

Figure 10A:
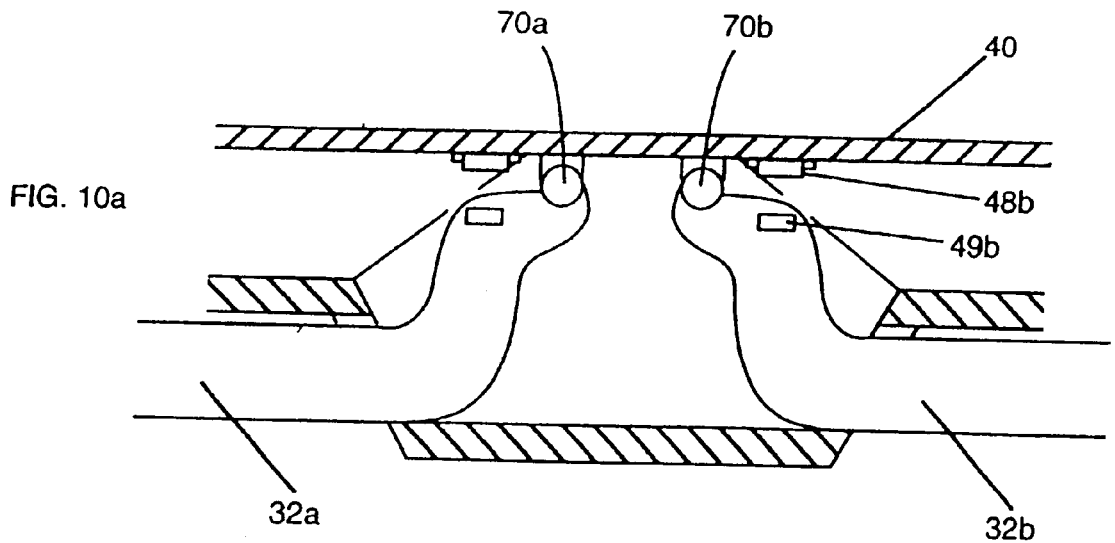
FIG. 10a is a partial cross section showing another embodiment of the internal operation of the game controller according to the fourth embodiment of the invention.
Figure 10B:
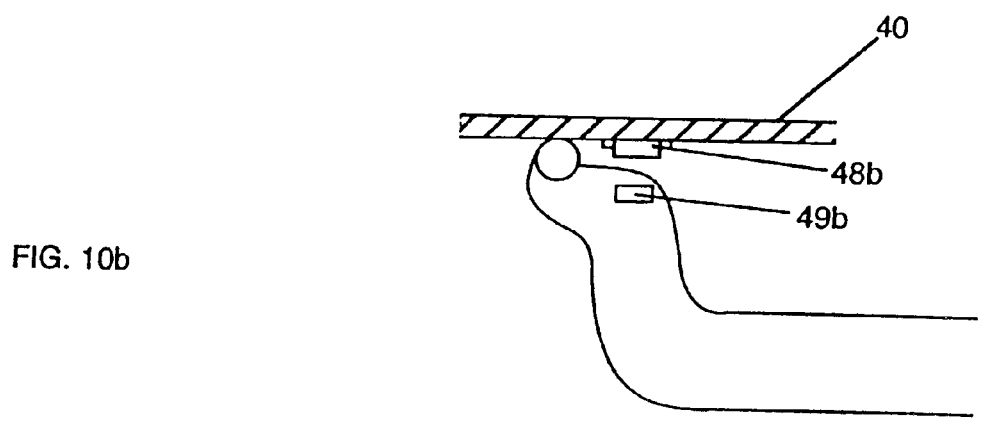
Figure 10C:
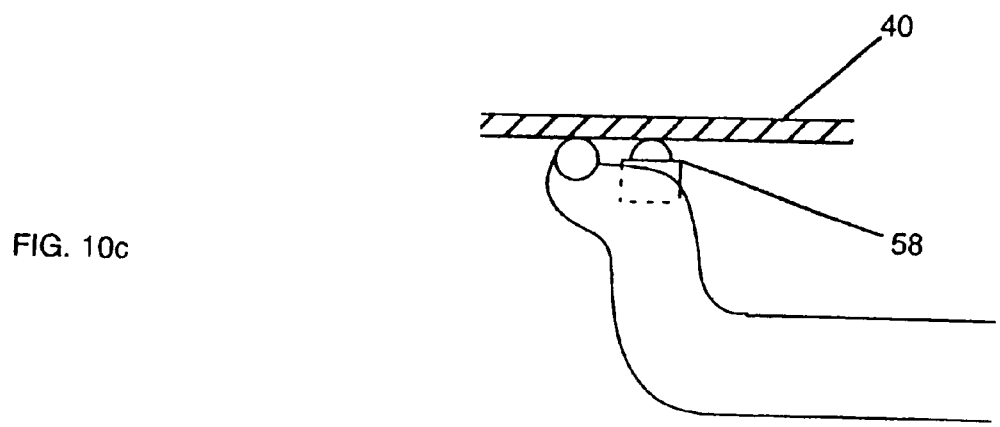

FIGS. 10a–10c show an alternative embodiment for implementing the pivoting steering lever 30 (made up of lever ends 32a and 32b) into the game controller. Accordingly, each lever end 34a and 34b is pivotally connected to the circuit board 40 or controller housing 12 via pivot shafts 70a and 70b, respectively. A hall effect sensor 48a and 48b is mounted on the circuit board 40, with correspondingly mounted magnets 49a and 49b on the respective levers 32a and 32b (FIGS. 10a and 10b). FIG. 10c shows an alternative embodiment where a pressure sensor 58 is connected to the circuit board 40 and operable to detect the pressure applied to the levers and output corresponding control signals from the game controller.

Figure 11B:
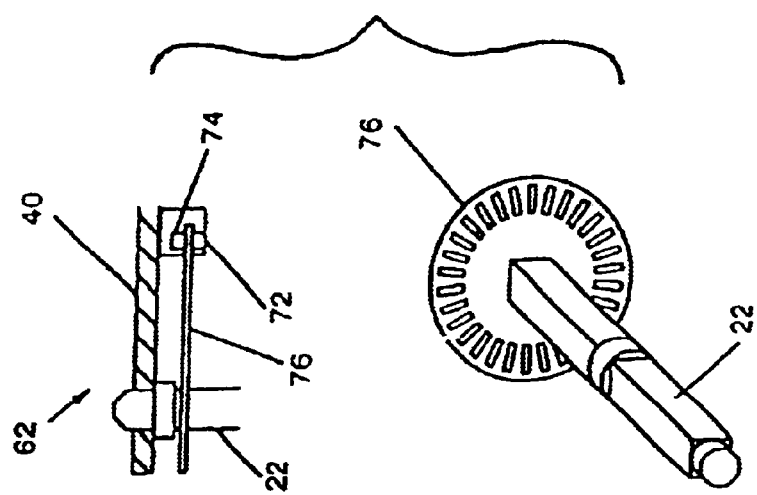
FIG. 11b is a block representation of the sensor configuration according to another embodiment of the invention.
Figure 11A:
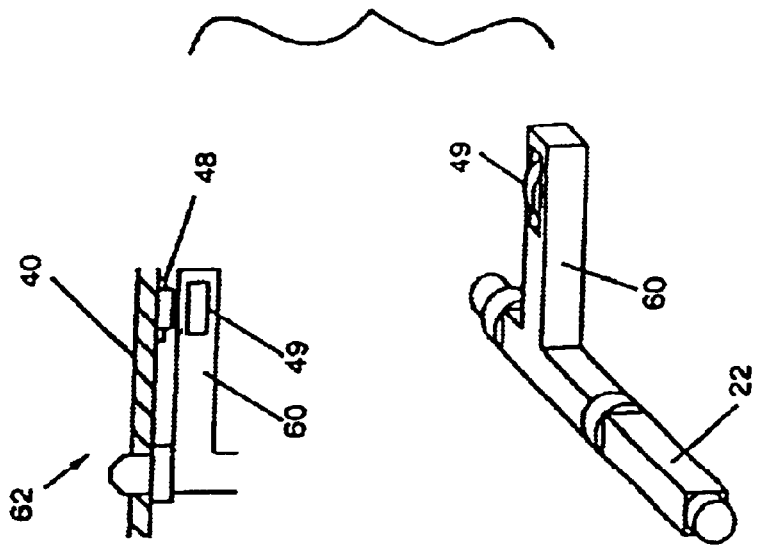
FIG. 11a is a block representation of the sensor configuration according to the embodiment invention.

FIGS. 11a–11c show various exemplary embodiments for the implementation of sensor mechanism 62. FIG. 11a shows the use of a hall effect sensor 48 mounted to the circuit board 40 and a correspondingly arranged magnet 49 carried by rotating extension 60. FIG. 11b shows the use of a light sensor 72 with light source 74 mounted on circuit board 40. A slotted wheel 76 passes between the sensor 72 and light source 74 so as to provide the rotation detection capability required for the levers. FIG. 11c shows another embodiment where a piezo sensor is mounted on the extension 60 and in electrical contact with the circuit board 40.

Those of ordinary skill in the art will recognize that the implementation embodiments shown in FIGS. 5a–11c are examples of such implementation and may be modified without departing from the spirit of the invention While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A genre specific game controller comprising:
   a game controller housing adapted for two-hand operation;
   a plurality of game controls disposed on an upper side of said housing; and
   a steering lever disposed on an underside of said housing and having two lever ends each adapted to be actuated by one of a user's hands, said steering lever for receiving steering inputs from a user.

2. The game controller according to claim 1, further comprising electronic circuitry disposed within said housing for outputting variable electrical control commands corresponding to variable positions of said lever ends for controlling steering actions in a video game.

3. The game controller according to claim 2, wherein said electronic circuitry comprises a printed circuit board contained within said housing and a potentiometer electrically connected to the printed circuit board and having a shaft connected to said lever, said potentiometer producing the variable control commands corresponding to the detected movement of the lever.

4. The game controller according to claim 2, wherein said electronic circuitry comprises:
   a printed circuit board contained within said housing;
   a first and a second potentiometer electrically connected to the printed circuit board; and
   a gearing mechanism connecting said first potentiometer to one of said lever ends and said second potentiometer to the other of said lever ends, wherein said first and second potentiometers produce the variable control commands corresponding to the detected movement of the lever.

5. The game controller according to claim 2, wherein said electronic circuitry comprises:
   a printed circuit board contained within said housing;
   at least one hall effect sensor electrically connected to said printed circuit board; and
   at least one magnet connected to said lever and disposed proximate said at least one hall effect sensor, said at least one hall effect sensor producing the variable control commands corresponding to the detected movement of the lever.

6. The game controller according to claim 2, wherein said electronic circuitry comprises:
   a printed circuit board contained within said housing;
   a first hall effect sensor corresponding to one of said lever ends and connected to said printed circuit board;
   a second hall effect sensor corresponding to the other of said lever ends and connected to said printed circuit board;
   a first magnet disposed on said lever end corresponding to said first hall effect sensor; and
   a second magnet disposed on said lever end corresponding to said second hall effect sensor;
   wherein said first and second magnets move with the respective lever ends and said first and second hall effect sensors produce the variable control commands corresponding to the detected movement of the first and second lever ends.

7. The game controller according to claim 2, wherein said electronic circuitry comprises:
   a printed circuit board contained within said housing;
   a light source connected to said printed circuit board;
   a light sensor connected to said printed board and operable with said light source; and
   a slotted wheel disposed between said light source and said light sensor and connected to said lever, wherein actuation of said lever ends causes rotation of said slotted wheel such that said light sensor produces the variable control commands corresponding to the detected movement of the lever.

8. The game controller according to claim 2, wherein said electronic circuitry comprises:
   a printed circuit board contained within said housing;
   a piezo sensor connected to at least one of said lever ends and in electrical contact with said circuit board, said piezo sensor detecting movement of said lever ends and producing the variable control commands corresponding to the detected movement.

9. A genre specific game controller comprising:
   a game controller housing being adapted for two-hand operation, said game controller housing having a central axis;
   a plurality of game controls disposed on an upper side of said housing, said game controls including a directional element operating in a two-dimensional horizontal plane transverse to said central axis;
   a steering lever having an axle and two lever ends each adapted to be actuated by one of a user's hands, said steering lever being disposed on an underside of said game controller housing such that said axle is aligned with said central axis, said steering lever for receiving steering inputs from a user; and
   electronic circuitry disposed within said game controller housing for detecting an operable position of said lever ends and outputting variable electrical control steering commands corresponding to the detected positions of said lever ends.

10. The game controller according to claim 9, wherein said electronic circuitry comprises a printed circuit board contained within said housing and a potentiometer electrically connected to the printed circuit board and having a shaft connected to said lever, said potentiometer producing the variable control commands corresponding to the detected movement of the lever.

11. The game controller according to claim 9, wherein said electronic circuitry comprises:
   a printed circuit board contained within said housing;
   a first and a second potentiometer electrically connected to the printed circuit board; and
   a gearing mechanism connecting said first potentiometer to one of said lever ends and said second potentiometer to the other of said lever ends, wherein said first and second potentiometers produce the variable control commands corresponding to the detected movement of the lever.

12. The game controller according to claim 9, wherein said electronic circuitry comprises:
   a printed circuit board contained within said housing;
   at least one hall effect sensor electrically connected to said printed circuit board; and at least one magnet connected to said steering lever and disposed proximate said at least one hall effect sensor, said at least one hall effect sensor producing the variable control commands corresponding to the detected movement of the lever.

13. The game controller according to claim 9, wherein said electronic circuitry comprises:

a printed circuit board contained within said housing;

a first hall effect sensor corresponding to one of said lever ends and connected to said printed circuit board;

a second hall effect sensor corresponding to the other of said lever ends and connected to said printed circuit board;

a first magnet disposed on said lever end corresponding to said first hall effect sensor; and a second magnet disposed on said lever end corresponding to said second hall effect sensor;

wherein said first and second magnets move with the respective lever ends and said first and second hall effect sensors produce the variable control commands corresponding to the detected movement of the first and second lever ends.

14. The game controller according to claim 9, wherein said electronic circuitry comprises:

a printed circuit board contained within said housing;

a light source connected to said printed circuit board;

a light sensor connected to said printed board and operable with said light source; and a slotted wheel disposed between said light source and said light sensor and connected to said lever, wherein actuation of said lever ends causes rotation of said slotted wheel such that said light sensor produces the variable control commands corresponding to the detected movement of the lever.

15. The game controller according to claim 9, wherein said electronic circuitry comprises:

a printed circuit board contained within said housing; and a piezo sensor connected to at least one of said lever ends and in electrical contact with said circuit board, said piezo sensor detecting movement of said lever ends and producing the variable control commands corresponding to the detected movement.

* * * * *